Jan. 9, 1962  B. R. SALTZBERG  3,016,517
REDUNDANT LOGIC CIRCUITRY
Filed May 15, 1959  6 Sheets-Sheet 1
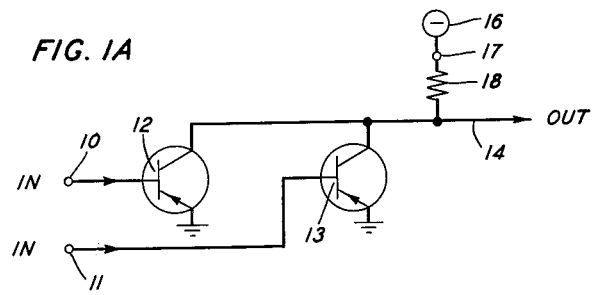
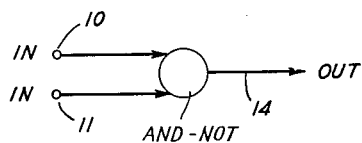
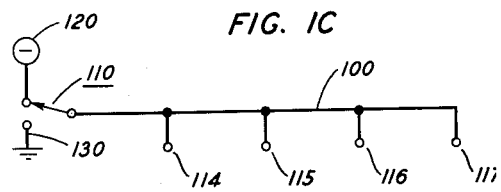
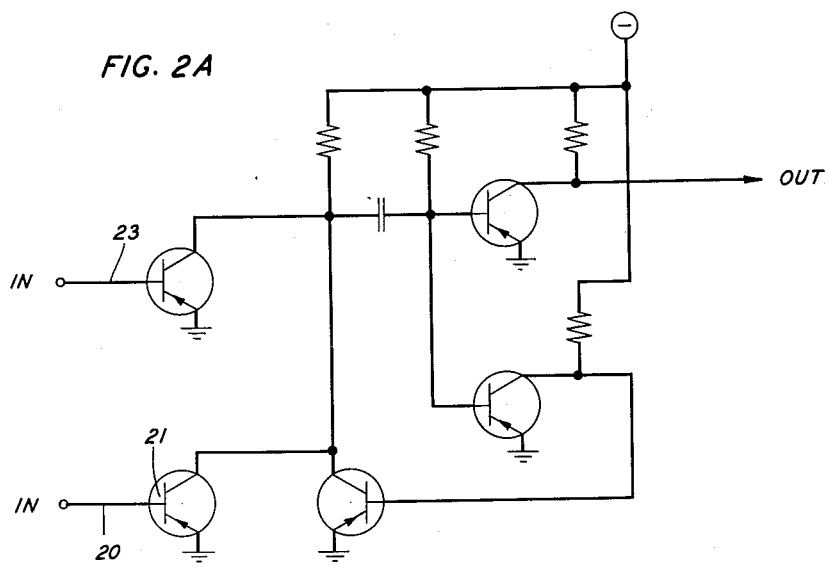
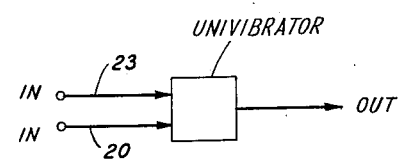
INVENTOR
B. R. SALTZBERG
BY Lucian C. Canepa
ATTORNEY Jan. 9, 1962    B. R. SALTZBERG    3,016,517
REDUNDANT LOGIC CIRCUITRY
Filed May 15, 1959    6 Sheets-Sheet 4

INVENTOR
B. R. SALTZBERG
BY Lucian C. Canepa
ATTORNEY

Jan. 9, 1962 B. R. SALTZBERG 3,016,517
REDUNDANT LOGIC CIRCUITRY
Filed May 15, 1959 6 Sheets-Sheet 5

INVENTOR
B. R. SALTZBERG
BY Lucian C. Canepa
ATTORNEY

Jan. 9, 1962  B. R. SALTZBERG  3,016,517
REDUNDANT LOGIC CIRCUITRY
Filed May 15, 1959  6 Sheets-Sheet 6

INVENTOR
B. R. SALTZBERG
BY Lucian C. Canepa
ATTORNEY

United States Patent Office 3,016,517
Patented Jan. 9, 1962

3,016,517
REDUNDANT LOGIC CIRCUITRY
Burton R. Saltzberg, New Providence, N.J., assignor to Bell Telephone Laboratories, Incorporated, New York, N.Y., a corporation of New York
Filed May 15, 1959, Ser. No. 813,375
7 Claims. (Cl. 340—147)

This invention relates to redundant digital data processing circuits and more particularly to the testing of self-correcting quadruplicated circuits.

Many proposals have been made for coping with the problem of errors in digital data processing or logic systems. One such proposal is disclosed in J. G. Tryon Patent 2,942,193, issued June 21, 1960. The Tryon proposal is based on the discovery that error correction may be provided in many logic systems by quadruplicating or quadding the circuits thereof. By properly connecting groups or levels of quadded circuitry there may be formed configurations in which transient errors or component failures may be self-corrected within two levels after they occur.

To attain the theoretically high reliability characteristic of quadded circuitry, it is necessary to test or check the circuitry at regular intervals, thereby to prevent the accumulation therein of a number of uncorrectable errors. However, the very ability of quadded circuitry to operate correctly in the presence of isolated faults makes it difficult to locate therein a defective component or a faulty connection.

Accordingly, an object of the present invention is to improve redundant circuitry.

More specifically, an object of this invention is to facilitate the testing of quadded circuitry.

These and other objects of the present invention are attained in specific illustrative embodiments thereof which include interconnected levels of quadded logic circuits which are arranged such that the redundant circuitry may be easily converted to a number of independent nonredundant circuits whose components and connections are exactly representative of the redundant system.

Specifically in illustrative embodiments of my invention the quadded logic circuits are connected to bus bar assemblies and swtich means are provided for either grounding or energizing these bus bar assemblies selectively. Accordingly the logic circuits are not all connected to a common source of energizing potential. Further, in accordance with the principles of my invention, the bus bar assemblies are arranged so that the quadded logic circuits of one level are selectively connected to one or more pairs of bus bar assemblies and the quadded logic circuits of succeeding levels are selectively connected to different pairs of bus bar assemblies. In this way, by grounding one of each pair of bus bar assemblies at each level, discrete and nonredundant paths through the different levels of the circuitry are defined. These nonredundant paths may then be tested, following which a different combination of the pairs of bus bar assemblies to the respective levels is selected and a new set of nonredundant circuits defined and tested.

It should be noted that by employing selected combinations of connections between the logic circuits and the energizing sources, the interconnections between the various logic circuits on the different levels of the redundant circuitry are not altered or changed in any way. Thus the testing of each nonredundant path defined by operation of selected groups of bus bar assemblies is a true test of that path in the redundant circuitry.

A feature of this invention is a redundant system that is convertible to a number of nonredundant circuits which include all the components and connections of the redundant system.

Another feature of the present invention is quadruplicated logic circuitry to which bus bar assemblies are selectively connected in a manner such that the quadruplicated circuitry may easily be converted to a number of independent nonredundant circuits, the aggregate of which is exactly representative of the connections and components of the quadded circuitry.

A complete understanding of the present invention and of these and various other features thereof may be gained from a consideration of the following detailed description and the accompanying drawings, in which:

FIG. 1A is a circuit diagram of a basic logic circuit out of which illustrative embodiments of the principles of the present invention may be formed;

FIG. 1B is a symbolic depiction of the circuit of FIG. 1A;

FIG. 1C shows a bus bar assembly to which circuits of the form of FIG. 1A, or that of FIG. 2A, may be connected;

FIG. 2A is a circuit diagram of another basic logic circuit out of which illustrative embodiments of this invention may be formed;

FIG. 2B is a symbolic depiction of the circuit of FIG. 2A;

Figure 3:
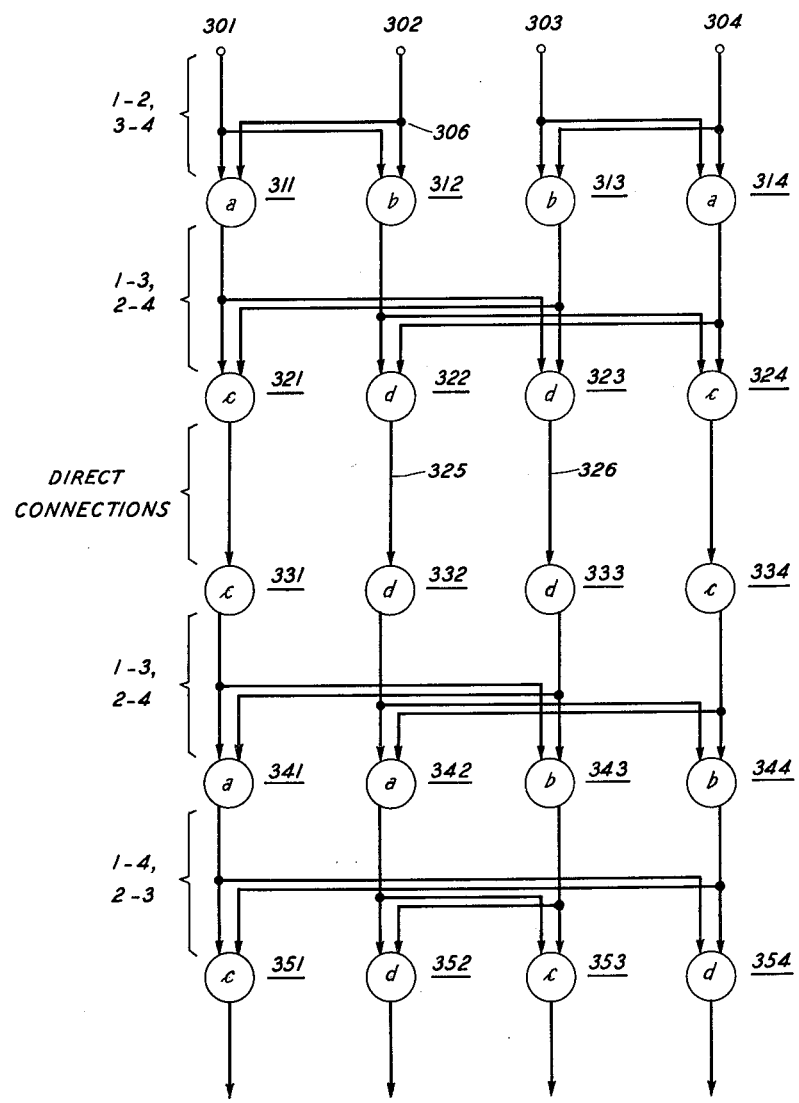
FIG. 3 is a schematic showing of a specific illustrative embodiment of the principles of the present invention.

Before proceeding to a presentation of specific illustrative embodiments of the principles of the present invention, there will be described, with the aid of FIGS. 1A, 1B, 2A and 2B, two typical basic logic circuits or building blocks out of which embodiments of this invention may be formed.

Referring now to FIG. 1A, there is shown a direct coupled transistor logic circuit with which it is possible to implement all logical functions. In such a circuit a voltage near ground potential is typically designated "1" and a high negative voltage with respect to ground is considered to be "0." The arrangement shown in FIG. 1A is commonly referred to as an AND-NOT circuit.

The configuration of FIG. 1A, which is depicted symbolically in FIG. 1B, includes input terminals 10 and 11, transistors 12 and 13, an output lead 14, a collector resistor 18, and a source 16 of negative potential. Note that the configuration also includes a point 17, the significance of which will be understood when the bus bar assembly shown in FIG. 1C is described hereinbelow.

If a "0" is applied to one or both of the input terminals 10 and 11 of FIG. 1A, a "1" appears on the output lead 14. On the other hand, the application of a"1" to both of the terminals 10 and 11 results in the appearance on the lead 14 of a "0."

Terminal 11 and transistor 13 may be eliminated from the circuit shown in FIG. 1A thereby to form a single input logic circuit which performs the negation or inversion function. That is, the application of a "0" to the terminal 10 produces on the lead 14 a "1" signal and the application of a "1" signal to the terminal 10 produces on the lead 14 a "0" signal. Such a configuration is commonly referred to as a Negate circuit.

FIG. 1C depicts a bus bar assembly from which, in accordance with an aspect of the principles of this invention, power may be distributed to a plurality of circuits of the form of that of FIG. 1A, or that of FIG. 2A. The assembly includes a bus bar 100, a switch 110 by means of which the bar 100 may be either connected to a source 120 of negative potential or to a grounded lead 130, and points 114 through 117 which are connected to the bar 100.

The point 17 of FIG. 1A may be connected to the point 117 of FIG. 1C, in which event the source 16 of FIG. 1A is not required. The collector resistor 18 of FIG. 1A is then connected to the source 120 (FIG. 1C) or, alternatively, depending on the position of the switch 110, to ground by the lead 130. As described in detail hereinbelow, other logic circuits, on the same or different levels, may be supplied from the bus bar 100 by being respectively connected to the points 114, 115, and 116, etc.

FIG. 2A shows a univibrator circuit, another one of the basic building blocks of direct coupled transistor logic; FIG. 2B is a symbolic or schematic representation of this circuit. The output of the univibrator, which is normally "1," i.e., near ground potential, switches to "0" and remains there for a predetermined length of time in response to the input undergoing a "1" to "0" transition. A "0" to "1" input transition, however, has no effect on the output.

The univibrator circuit of FIG. 2A may include one or two input leads. If only one input is required lead 20 and transistor 21 may be omitted. Then a "1" to "0" transition on the single input lead 23 triggers an output pulse. If, on the other hand, two input leads 20 and 23 are employed, the input circuitry acts as an AND circuit, i.e., both inputs must be in the "1" state for a "1" to "0" transition at either input to be effective in triggering an output pulse.

It is noted in passing that the basic principles of direct coupled transistor logic are more fully described in an article entitled "Surface-Barrier Transistor Switching Circuits" by R. H. Beter et al., which appeared in Part IV of the 1955 Institute of Radio Engineers Convention Record, at pages 139 through 145 thereof.

Turning now to the essence of the invention itself, FIG. 3 depicts a portion of a quadded logical system, made in accordance with the principles of the aforementioned Tryon invention, to which have been added structural features illustrative of the principles of this invention, thereby to form a redundant circuit which may easily be broken down to a number of indepedent nonredundant circuits, the sum of whose components and connections are exactly representative of or equivalent to the redundant arrangement.

Before further discussing the unique arrangements of quadded circuitry depicted in FIG. 3, it would be, perhaps, useful to discuss briefly the type of system or circuitry in which logic circuitry, such as shown in FIG. 3, would be employed. In certain data processing systems where extreme reliability and error free operation is essential, it has been common to perform the same operation a number of times and then, as by a vote taking procedure, determine the correct answer. In quadded circuits the vote taking procedure is eliminated and four operations are instead performed, each of which, due to the unique connections of the quadded circuitry, affects the ultimate reseults. Thus in a quadded circuit each logic circuit or gate of the original circuit is replaced by four logic circuits or gates.

Such quadded circuitry can be used for shift registers, timing sequence generators, parity check circuits, or any other type of logica,l circuit configuration. FIG. 3 can be considered to be a portion of the circuitry of a self-correcting shift register employed in a parity code receiver. In this circuitry the same information should be appearing at all four inputs and at all four outputs as they are quadded arrangements of only the single input and single output of the original, basic logic circuit. The circuitry of FIG. 3 has been selected to depict the principles of the present invention because of the simplicity of the actual logical functions being performed; it is to be understood, however, that any system of logical circuits or gates can be converted to quadded circuitry and can be arranged in the quadded circuitry in accordance with the principles of my invention to enable nonredundant testing of the circuits.

The ability of quadded circuitry to operate correctly in the presence of isolated faults makes difficult the location therein of faulty connections or defective components. Such location, as a result of regular periodic testing is, however, essential, for if a large number of single faults are permitted to accumulate the probability of the next fault being one which causes failure of the circuitry is greatly increased.

A redundant circuit may be tested, in accordance with the principles of this invention, by reducing it to a number of nonredundant circuits in a given one of which are eliminated the effects of all components and connections which are not to be included in the nonredundant arrangement. This elimination process must, of course, not alter the normal interconnections and operations of the included components and, further, the aggregate of the components and connections of the nonredundant circuits must be exactly representative of the redundant circuit.

Referring again to FIG. 3, there is shown an arrangement which includes five levels of quadded circuitry, the first or topmost level comprising logic circuits 311 through 314 and the fifth level comprising logic circuits 351 through 354, the logic circuits of each level in between being similarly numbered. The arrangement includes four input terminals 301 through 304 from which electrical leads extend to selected ones of the inputs of the circuits 311 through 314. More specifically, the terminal 301 is connected to one of the inputs of the circuit 311 and also to one of the inputs of the circuit 312, and the terminal 302 is connected to the other one of the inputs of the circuit 312 and also to the other one of the inputs of the circuit 311. Similarly, the terminal 303 is connected to one of the inputs of the circuit 313 and to one of the inputs of the circuit 314, and the terminal 304 is connected to the other one of the inputs of the circuit 314 and to the other one of the inputs of the circuit 313. This pattern of interconnections is represented by the numbers 1–2, 3–4 which appear in FIG. 3 above and to the left of the first level of logic circuits 311 through 314, considering the vertical columns of logic circuits to be numbered successively 1, 2, 3 and 4 from left to right in FIG. 3. Other correspondingly-located notations in FIG. 3 indicate the manner in which the successive logic levels thereof are interconnected.

It is of interest in passing to demonstrate briefly the self-correcting properties of quadded circuitry. Assume that a "1" is coupled to each of the input terminals 301 through 304 of FIG. 3. Each of the circuits 311 through 314 then has a "1" applied to each of its inputs and, as a result, a "0" appears at the output of each of those circuits. The "0's" in turn result in a "1" appearing on each of the direct connections extending between the second and third logic levels.

Assume now that a malfunction causes a "0" rather than a "1" to be applied to the input terminal 302, the other terminals 301, 303, and 304 again each having a "1" coupled thereto. The outputs of the circuits comprising the first logic level are then, reading from left to right, "1," "1," "0," and "0." However, the outputs of the circuits comprising the second logic level are each "1," in view of the fact that a "0" is coupled to an input of each of them, and, as a result, a "1" again appears on each of the direct connections extending between the second and third levels. Thus, it is seen that an input error is corrected or compensated for within two levels.

The logic circuits of FIG. 3 are supplied, in accordance with the principles of this invention, from one or more power supplies by means of four bus bar assemblies a, b, c, and d, each one of which is similar to the assembly shown in FIG. 1C. The symbols for each of the AND-NOT circuits of FIG. 3 include therein one of the letters *a* through *d*, thereby to indicate to which one of the four bus bar assemblies the AND-NOT circuit is connected.

The grounding of selected pairs of the bus bar assemblies *a* through *d* of FIG. 3 converts the quadded arrangement there shown to a number of isolated nonredundant parallel paths, each of which extends between an input and an output terminal. Each nonredundant path, it is noted, is not characterized by a self-correcting property. The individual testing of all of these nonredundant paths completely tests the quadded arrangement.

In general, the reduction of a redundant arrangement to a number of nonredundant ones can be realized by setting all undesired inputs (i.e., inputs which are not to be tested) to OR type circuits to "0" and undesired inputs to AND type circuits to "1." The circuits will then still perform their intended logical operations on their remaining inputs and any deviation in the pattern of output signals from a normal condition would clearly be attributable to faults in the path including the remaining inputs.

In direct coupled transistor logic circuitry the conversion of a redundant arrangement to a number of nonredundant configurations can be obtained by setting the outputs of selected ones of the units to "1," or, in other words, by grounding the output leads of the selected ones.

A specific example will best serve to develop an understanding of the principles of the present invention. Assume that a point 306 in the arrangement of FIG. 3 has been accidentally grounded. The problem then is to locate this fault and correct it before it, in combination with another fault, results in a set of conditions which is beyond the error-correcting capabilities of the quadded circuitry. One straightforward testing procedure would eventually result in coupling one type of signal to the input 302 and another type or no signal at all to the other inputs. For example, assume a test which involves coupling a "0" to the input 302 while connecting each of the other inputs to ground, i.e., coupling a "1" to each of the other inputs.

Since, however, as described above, the arrangement of FIG. 3 provides a "1" on each of the direct connections extending between the second and third levels, regardless of whether a "1" (ground) or a "0" is coupled from the input 302 (or the point 306) to the circuit 312, it is seen that the straightforward testing approach is insensitive to the presence of the assumed fault. In other words, the pattern of signals appearing on the direct connections is the same in the absence or in the presence of a fault.

Assume now that, in accordance with the principles of the present invention, the bus bar assemblies *a* and *c* of the arrangement of FIG. 3 are grounded, and that then in the absence of a fault in the arrangement a "0" is coupled to the input 302 and a "1" to each of the other inputs. There will then appear, reading from left to right, on the direct connections between the second and third logic levels signals representative of "1," "0," "1," and "1."

Next, assume that the same inputs are applied to the arrangement of FIG. 3 in the presence of a ground fault at the point 306. Then the signals appearing on the direct connections are "1," "1," "1," and "1." This deviation from the previous or normal signal pattern serves to indicate that a fault exists. More specifically, the deviation indicates that the fault is in the series path extending between the input 302 and the direct connection 325, in view of the fact that the grounded outputs of the circuits connected to the *a* and *c* bus bar assemblies are isolated in the respect that they remain the same whether or not a fault exists in the circuitry. Accordingly, the deviation in signal patterns could not have been caused by the circuits whose outputs remained fixed at ground potential. Furthermore, the series path extending between the input 303 and the direct connection 326 does not influence the signal appearing on the lead 325. As a result, the deviation from the normal or no-fault signal pattern, and more specifically the deviation in the signal appearing on the lead 325, must have been caused by a fault in the series path interconnecting the input 302 and the direct connection 325. Other straightforward diagnostic studies of this series path will then reveal the exact location and nature of the fault.

Any fault occurring in a logic circuit whose symbol includes a *b* or a *d*, or in the leads extending thereto or therefrom, can be exactly located by a testing procedure which includes the grounding of the bus bar assemblies *a* and *c*. More specifically, the grounding of bus bars *a* and *c* of the configuration shown in FIG. 3 effectively removes from the configuration all those logic circuits whose symbolic representations include either an *a* or a *c* therein and reduces the redundant circuitry to the two nonredundant and easily testable paths or circuits shown in FIG. 4A.

Figure 4:
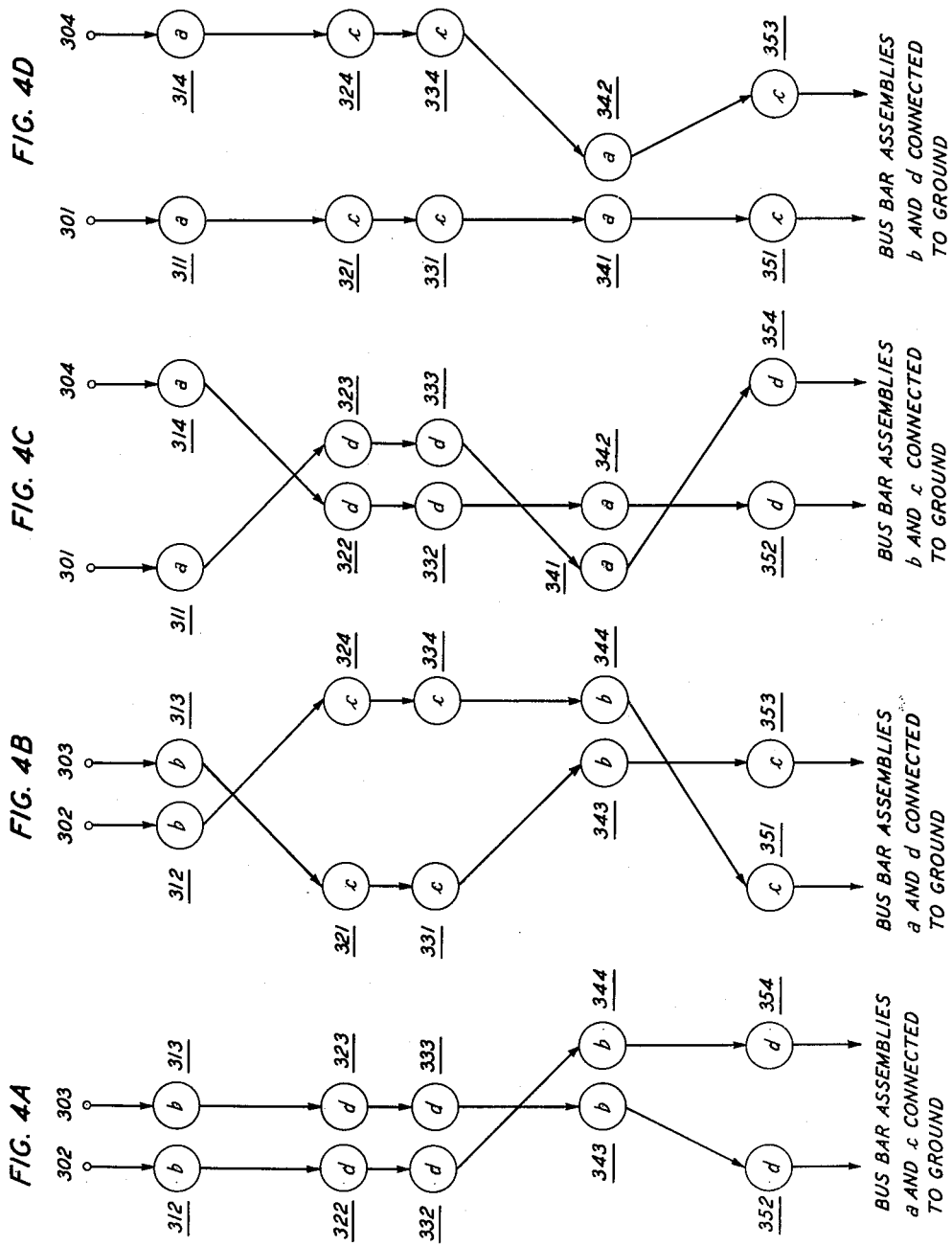
FIGS. 4A through 4D shows the nonredundant circuits to which the embodiment of FIG. 3 is convertible.

Similarly, FIGS. 4B, 4C, and 4D depict, respectively, the circuits which result from the grounding of bus bar pairs *a* and *d*, *b* and *c*, and *b* and *d*. In each case two noninteracting nonredundant circuits are obtained, and the aggregate of the eight nonredundant circuits shown in FIGS. 4A through 4D include all the connections and components of the quadded circuit shown in FIG. 3.

The bus bars of the novel configuration of FIG. 3 are arranged in accordance with the following rules:

(1) Employ four bus bars; divide the bus bars into two pairs; supply the first level of logic circuits from a first pair of bus bars, two logic circuits from one of the bars of the pair and the other two circuits from the other one of the pair;

(2) Supply inversion circuits, i.e., circuits having single inputs, from the same bus bars as supply the correspondingly-positioned logic circuits in the preceding level;

(3) Disregarding those levels which include inversion circuits, supply successive levels by means of different pairs of bus bars;

(4) In a given level, do not supply by the same bus bar those logic circuits which have either paired inputs or outputs;

(5) To obtain two independent nonredundant circuits, ground one bus bar of each pair, thereby to provide four grounded combinations of bus bars and eight nonredundant circuits, the testing of which completely tests the redundant circuit.

Figure 5:
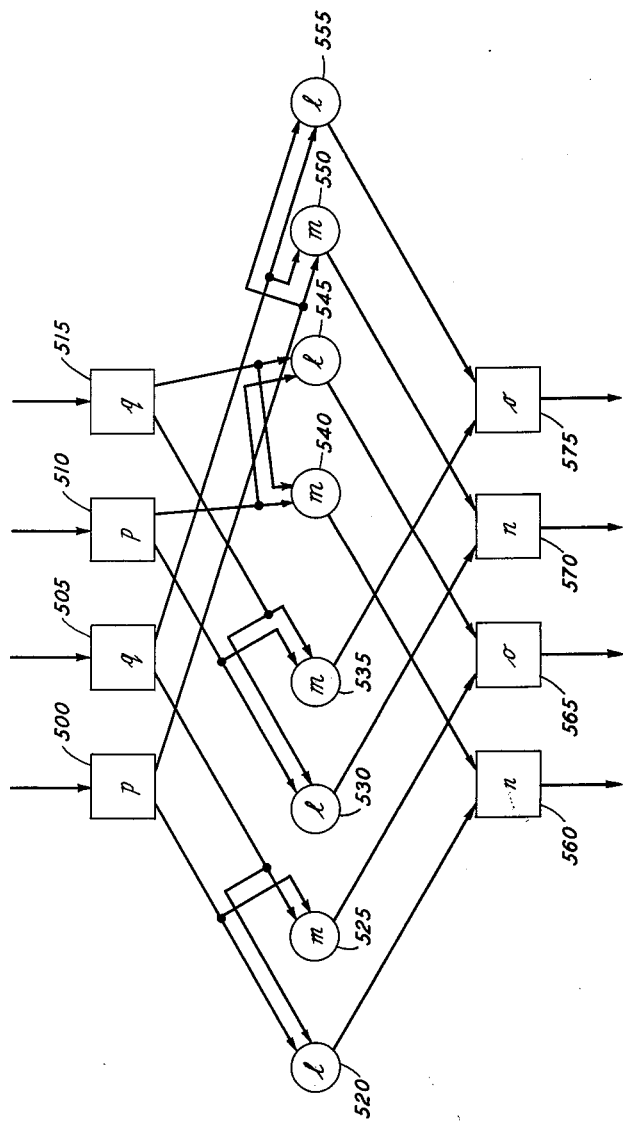
FIG. 5 is a schematic showing of another specific illustrative embodiment of the principles of this invention.
Figure 6B:
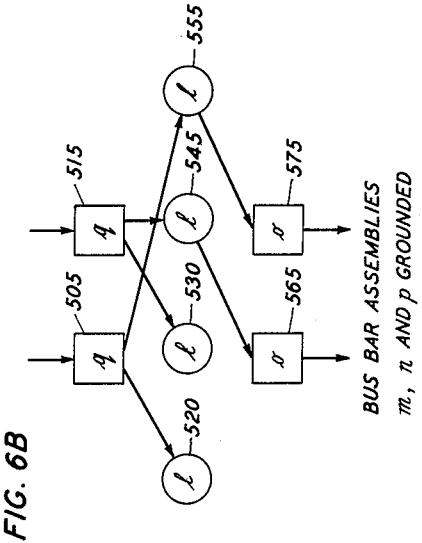
FIGS. 6A through 6H depict the nonredundant circuits to which the embodiment of FIG. 5 is convertible.
Figure 6D:
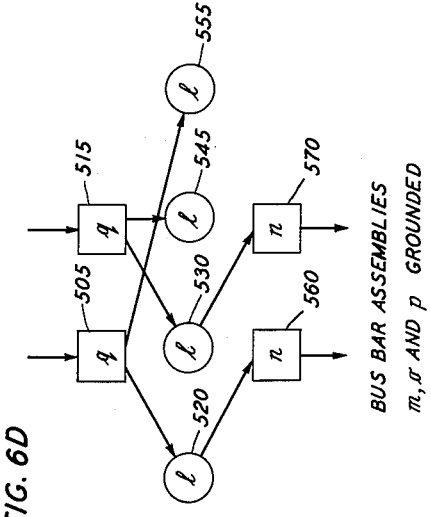
Figure 6A:
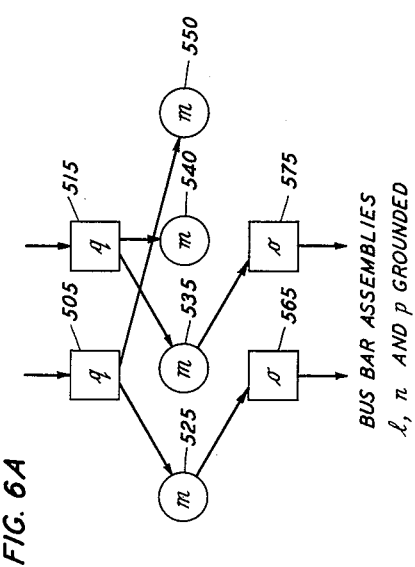
Figure 6C:
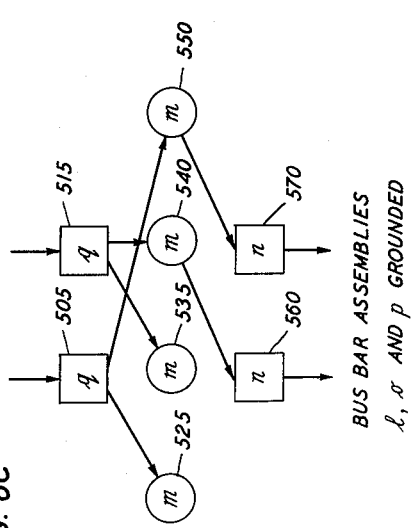
Figure 6F:
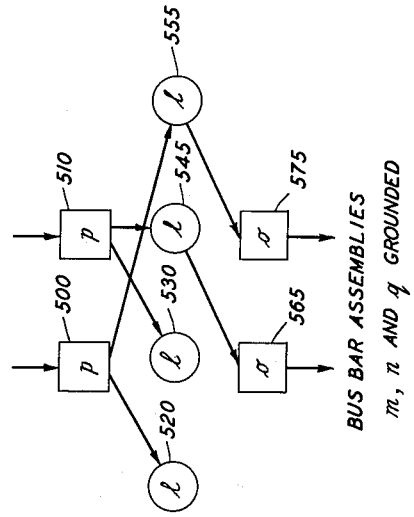
Figure 6H:
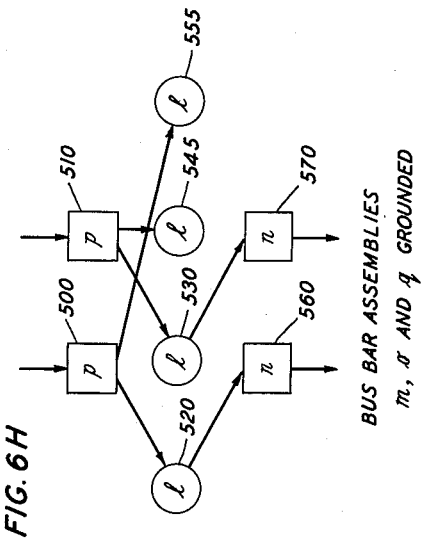
Figure 6E:
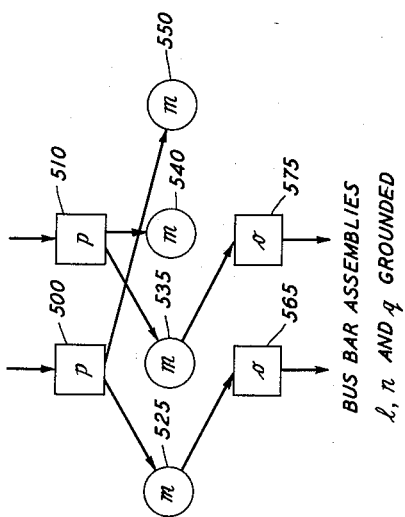
Figure 6G:
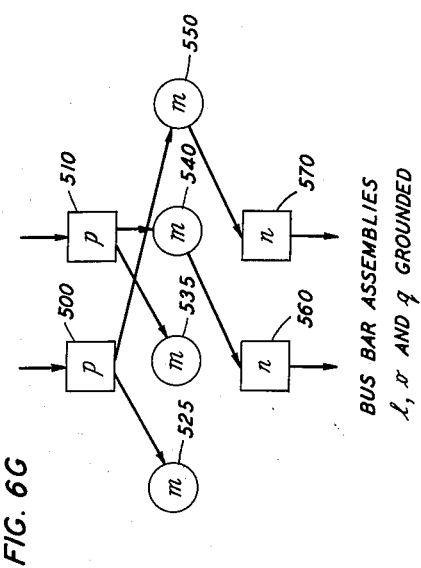

FIG. 5 shows a quadded arrangement which includes logic and univibrator circuits of the type shown in FIGS. 1A and 2A, respectively. Unlike the circuitry of FIG. 3, which was shown mainly to enable an understanding of the principles of the invention, the circuit of FIG. 5 is an actual logic circuit configuration and specifically is a timing chain in which outputs appear at specific intervals due to the memory characteristics of the univibrator circuits.

The circuits of FIG. 5 are connected, in accordance with the principles of this invention to six bus bar assemblies, designated *l*, *m*, *n*, *o*, *p*, and *q*, each one of which may be of the type of the one of FIG. 1C. Each circuit symbol includes a letter therein, thereby to indicate which of the six bus bar assemblies is associated therewith. Note that the AND-NOT circuits interconnecting the two quadruplicated univibrator levels are double-quadruplicated.

If the six bus bars of FIG. 5 are divided into three pairs and if one bus bar per pair is grounded, there are formed eight different combinations, each including three grounded bus bars. The independent redundant configurations which result from these eight combinations are shown, respectively, in FIGS. 6A through 6H, wherein logic blocks which correspond to those of FIG. 5 are identified by corresponding reference numerals. The testing of the sixteen nonredundant paths shown in those figures completely tests the redundant circuitry shown in FIG. 5.

Thus, the application of the principles of this invention to quadded circuitry facilitates the testing thereof, by making such circuitry easily convertible to a number of independent nonredundant paths, the aggregate of whose connections and components is exactly representative of the redundant circuitry. The independent paths, each of which is not characterized by being self-correcting, may then be tested by appropriate checking techniques, such as for example, signal tracing, to detect the presence therein of faulty components and/or connections.

It is to be understood that the above-described arrangements are only illustrative of the application of the principles of the present invention. Numerous other arrangements may be devised by those skilled in the art without departing from the spirit and scope of this invention. For example, although emphasis herein has been directed to AND-NOT and univibrator circuits each having either one or two input terminals, it is to be understood that this invention may be embodied in arrangements of AND-NOT and univibrator circuits each having various numbers of input terminals. Furthermore, in addition to being applicable to quadded direct coupled transistor logic circuits, the present invention is applicable to quadded arrangements of any one of the many types of logic circuits which are well known in the art. Thus, a quadded arrangement of any type of logic circuit may be reduced to nonredundant arrangements. This may be accomplished by setting all undesired inputs to OR type circuits to "0," and all undesired inputs to AND type circuits to "1."

What is claimed is:

1. Circuitry including a plurality of levels of quadruplicated circuits, means for interconnecting said levels, and bus bar means connected to said circuits for converting said circuits to a number of nonredundant circuits which are exactly representative of said circuitry.

2. A plurality of interconnected levels of quadruplicated circuitry, some of said levels including AND-NOT circuits and the others of said levels including Negate circuits, first and second pairs of bus bar assemblies connected to said circuits, and means for selectively grounding one assembly of each of said pairs, thereby to convert the interconnected quadruplicated circuitry to two independent nonredundant circuits.

3. In combination, a quadruplicated level of univibrator circuits, a double-quadruplicated level of AND-NOT circuits, a second quadruplicated level of univibrator circuits, three pairs of bus bar assemblies connected respectively to said three levels, means for interconnecting said levels, and means for grounding one assembly of each of said pairs, thereby to convert the combination to two independent nonredundant circuit paths.

4. A plurality of interconnected levels of quadruplicated logic circuits, a plurality of bus bar assemblies, and means for selectively grounding said bus bar assemblies to convert said quadruplicated logic circuits to a plurality of independent nonredundant circuits.

5. In combination, a plurality of interconnected levels of quadruplicated circuitry, each of said levels including quadruplicated logic circuits, a plurality of pairs of bus bar assemblies, source means connected to said bus bar assemblies, means connecting a first pair of said quadruplicated logic circuits at each level to one bus bar assembly of a pair of said assemblies and a second pair of said quadruplicated logic circuits at each level to the other bus bar assembly of said pair of said assemblies, quadruplicated logic circuits of different levels being connected to different pairs of bus bar assemblies and the same bus bar assembly at any one level not being connected to a pair of said logic circuits having interconnected input or output circuits, and means for selectively disconnecting groups of said bus bar assemblies from said source means to convert said interconnected levels of quadruplicated circuitry into distinct nonredundant series connections of said logic circuits.

6. In combination in a redundant system, a plurality of interconnected levels of quadruplicated circuits, and power source means connected to said quadruplicated circuits, said power source means including switching means for selectively deenergizing specified ones of the circuits in each level to convert said system for testing purposes to a number of nonredundant circuits the sum of whose components and connections is exactly representative of the quadruplicated circuits.

7. In combination in a redundant system, a plurality of interconnected levels of quadruplicated circuits, bus bar means connected to said circuits, at least one pair of power sources associated with each level of said circuits, and switching means for selectively connecting said bus bar means to said power sources to convert said redundant system to a plurality of nonredundant systems the sum of whose components and connections is exactly representative of the redundant system.

References Cited in the file of this patent

UNITED STATES PATENTS

| Re.23,601 | Hamming et al. | Dec. 23, 1952 |
| 2,512,038 | Potts | June 20, 1950 |